United States Patent [19]

Basrai et al.

[11] 4,450,753

[45] May 29, 1984

[54] ELECTRO-HYDRAULIC PROPORTIONAL ACTUATOR

[75] Inventors: Habil S. Basrai, Port Huron, Mich.; Ganesh Rajagopal, Richardson, Tex.

[73] Assignee: Ford Motor Company, Dearborn, Mich.

[21] Appl. No.: 149,065

[22] Filed: May 12, 1980

[51] Int. Cl.³ .......................... F15B 21/02; F15B 9/03; F15B 9/09
[52] U.S. Cl. ...................................... 91/35; 91/363 R; 91/446; 91/465
[58] Field of Search ................ 91/361, 363 R, 363 A, 91/465, 35, 446

[56] References Cited

U.S. PATENT DOCUMENTS 3,763,745 10/1973 Anderson ........................ 91/363 R
3,802,318  4/1974 Sibbald ............................ 91/363 R

FOREIGN PATENT DOCUMENTS 1800041  9/1977  Fed. Rep. of Germany ........ 91/361

Primary Examiner—Paul E. Maslousky
Attorney, Agent, or Firm—John J. Roethel; Clifford L. Sadler

[57] ABSTRACT

An electro-hydraulic proportional actuator in which the actuator piston position is hydraulically controlled by fluid flow through solenoid valves operable by an electronic control system. An operator control provides an input voltage representing a desired piston position and a transducer generates a voltage representing the actual piston position. The difference between the input and output voltages generates a difference or error signal that is fed into a feedback system including a sample-and-hold circuit. A clock logic system is provided for transmitting the signal from the feedback system to the solenoid valves at predetermined intervals to activate either valve to move the actuator piston in either direction or to activate both valves to hold the piston at a desired position.

8 Claims, 2 Drawing Figures

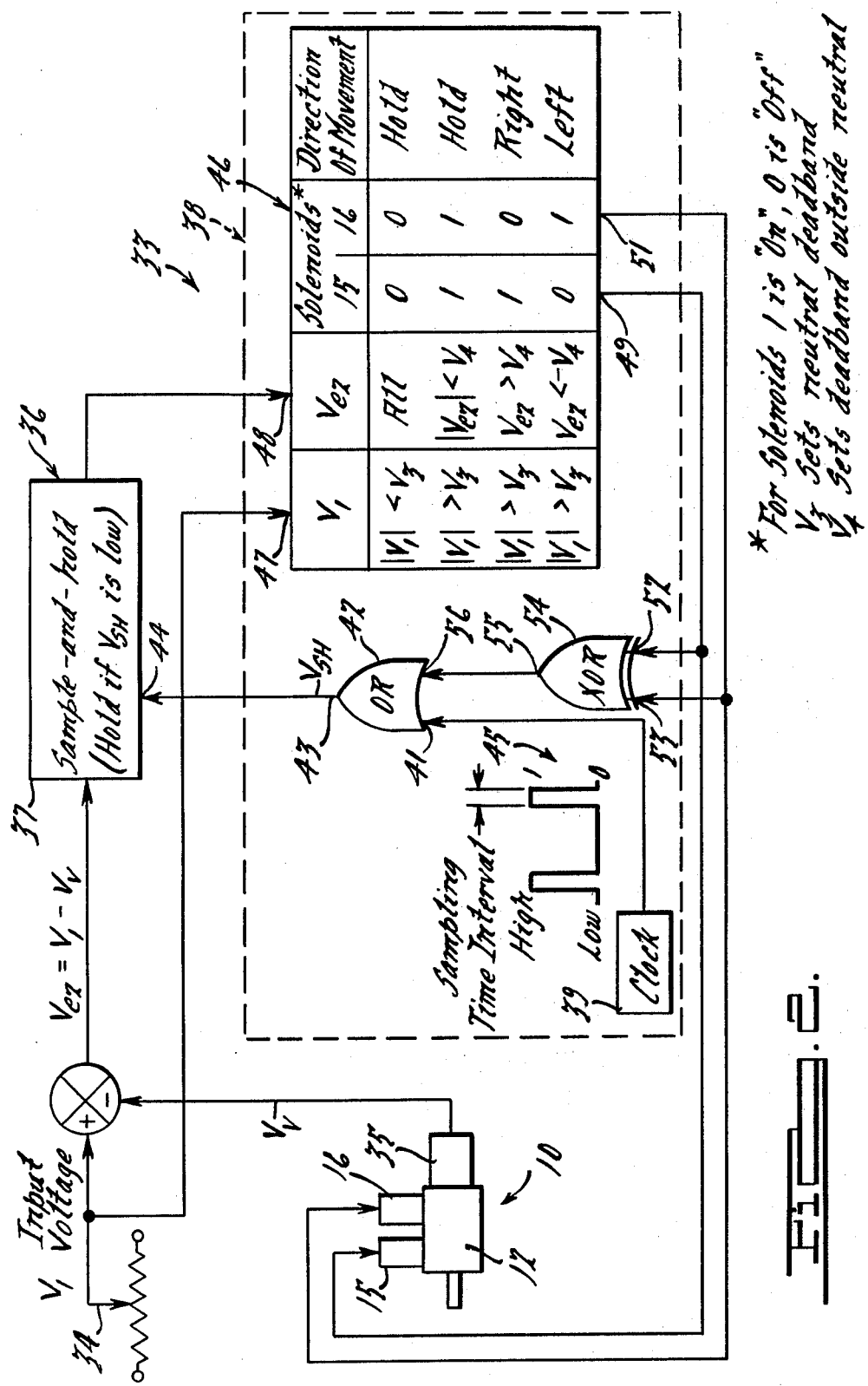

ELECTRO-HYDRAULIC PROPORTIONAL ACTUATOR

BACKGROUND OF THE INVENTION

Agricultural tractor draft controls traditionally have been hydro-mechanical systems wherein, for example, implement draft is sensed mechanically. Through appropriate linkage, a hydraulic valve is actuated to raise and lower the implement. Mechanical linkages have inherent limited flexibility which has been further reduced by the implementation of environmentally isolated cabs.

The development of low cost, reliable electronic microcomputers has introduced an unlimited flexibility in the design of tractor control systems. For example, implement draft sensing need no longer be limited to top-link, lower-link or output torque monitors, but can be correlated with wheel slip, engine speed, engine load and the like.

The primary requirement for implementing any tractor electro-hydraulic system is a low cost, contaminant insensitive, environmentally sound interface device, or an actuator, to convert an electric signal to either a mechanical or a hydraulic output.

SUMMARY OF THE INVENTION

The present invention relates to an electro-hydraulic proportional actuator comprising two three-way solenoid operated valves to position an actuator piston. Low pressure fluid is directed to either side of the piston by activating either of the two solenoid valves. Hence, the piston provides the necessary mechanical output at an amplified force limited only by the diameter of the piston.

The activation/deactivation of the solenoid valves is controlled by an electronic control system. The system comprises an operator control means that may be manipulated to provide an input voltage representing a desired actuator piston position. A transducer means coupled to the actuator piston generates an output voltage representing the actual position of the piston. The difference between the input and output voltages generates a difference or error signal that represents the difference between the actual and desired positions of the piston. The electronic control system includes a feedback system including a sample-and-hold circuit in a feedback path having an input to receive the difference or error signal. A clock logic means is provided for transmitting the difference or error signal from the feedback system to the solenoid valves at predetermined intervals to activate either valve to move the actuator piston in either direction or to activate both valves to hold the piston at a desired position.

DESCRIPTION OF THE DRAWINGS

Further features and advantages of the present invention will be made more apparent as this description proceeds, reference being had to the accompanying drawings, wherein:

FIG. 2 is a schematic of the electronic control circuit for the electro-hydraulic proportional actuator.

DETAILED DESCRIPTION OF THE INVENTION

Figure 1:
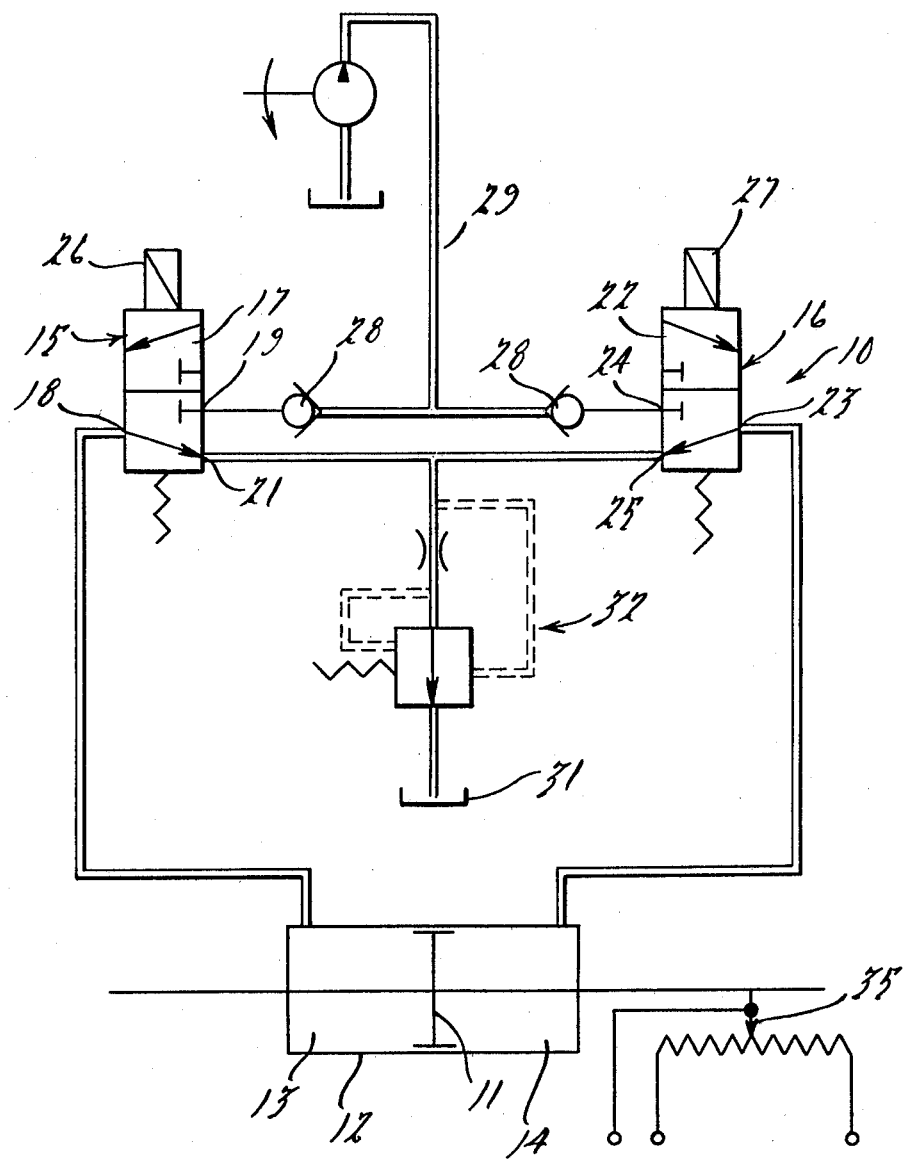
FIG. 1 is a schematic diagram of an electro-hydraulic proportional actuator adapted to be electronically controlled in accordance with the present invention.

Referring now to the drawings, a hydraulic schematic diagram of the electro-hydraulic proportional actuator, generally designated 10, is shown in FIG. 1. The actuator 10 has a double-acting, linearly movable piston 11 contained in a cylinder 12 having at each end chambers 13 and 14. A pair of three-way solenoid valves 15 and 16 communicate with the cylinder chambers 13 and 14, respectively. The solenoid valve 15 has a valve body 17 having an actuator port 18, an inlet port 19, and an outlet port 21. The solenoid valve 16 has a valve body 22 having an actuator port 23, an inlet port 24, and an outlet port 25. The solenoids 26 and 27 of the respective solenoid valves 15 and 16 control the flow of fluid through the valve bodies.

The valve inlet ports 19 and 24 are coupled through check valves 28 to a fluid pressure supply line 29. The return or outlet ports 21 and 25 are coupled to each other with the fluid flow therefrom being routed to a sump 31 through a pressure compensated flow control valve 32.

In the neutral state, both the solenoid valves 15 and 16 are off. The actuator piston 11 is free to float unless its position is determined by an external spring centering mechanism (not shown) or a spring (not shown) that biases the piston 11 to one end of its stroke. The neutral position would be chosen so that it is the safe position for the system if the electronic control system 33 for the actuator were to fail and power to both solenoid valves were to go off. To move the actuator piston to the right, solenoid valve 15 is turned on and solenoid valve 16 is turned off. To move the actuator piston to the left, solenoid valve 15 is turned off and solenoid valve 16 is turned on. The speed of the actuator piston is fixed by the setting of the pressure compensated flow control valve 32 in the return line. Any position of the actuator may be held even in the presence of external loads in either direction by turning both solenoid valves on.

The decisions to move to the right, left or hold are performed by the electronic control system 33 shown in FIG. 2.

The electronic control system 33 for operating the solenoid valves 15 and 16 to direct fluid flow into the chambers 13 and 14 of the cylinder 12 comprises an operator control 34 providing an input voltage $V_1$ representing a desired actuator assembly piston 11 position. A position transducer 35 coupled to the piston 11 of the actuator 10 generates an output voltage $V_v$ that represents the actual position of the piston 11. The difference between the input $V_1$ and transducer output voltage $V_v$ generates a difference or error signal $V_{e2}$ representing the spatial difference between the actual and desired positions of the piston 11. A feedback system, generally designated 36, includes a sample-and-hold circuit 37 in the feedback path.

A clock logic means 38 transmits the difference signal $V_{e2}$ from the feedback system sample-and-hold circuit 37 to the solenoid valves 15 and 16 at predetermined time intervals to activate either valve to move the actuator piston 11 in one direction or the other, or to activate both valves to hold the piston 11 at a desired position. The clock logic means 38 includes a clock 39 that provides a sampling frequency and is coupled to one input 41 of an "OR" gate 42. The output 43 of the "OR" gate 42 is coupled to an input 44 of the sample-and-hold circuit 37 and the signal from the "OR" gate 42 being denoted $V_{sh}$.

The sample-and-hold circuit passes the $V_{e2}$ signal when the $V_{sh}$ signal is in a logic "1" state, i.e., when the clock 39 pulse is "high", and retains the last value of $V_{e2}$ when the $V_{sh}$ signal is in a logic "0" state, i.e., when the clock 39 pulse is in a low state, as in the frequency diagram 45 shown in FIG. 2 adjacent the clock 39.

The clock logic means 38 includes a digital control 46 represented by a logic table, as follows:

| | | SOLENOIDS | | DIRECTION OF PISTON |
|---|---|---|---|---|
| $V_1$ | $V_{e2}$ | 15 | 16 | MOVEMENT |
| $\|V_1\| < V_3$ | ALL | 0 | 0 | HOLD IN NEUTRAL POSITION |
| $\|V_1\| > V_3$ | $\|V_{e2}\| < V_4$ | 1 | 1 | HOLD IN ANY POSITION OTHER THAN NEUTRAL |
| $\|V_1\| > V_3$ | $V_{e2} > V_4$ | 1 | 0 | RIGHT |
| $\|V_1\| > V_3$ | $V_{e2} < -V_4$ | 0 | 1 | LEFT |

For the solenoids: 1 is "On"; 0 is "Off"; $V_3$ is a preset threshold voltage determining the allowable deviation from the true desired neutral position referred to hence as the neutral deadband; $V_4$ is a preset threshold voltage determining the allowable deviation from any true desired position other than neutral, referrred to hence as the deadband outside neutral. "+" $V_4$ is an allowable deviation for movement of the piston 11 to the right as viewed in FIG. 1 and "−" $V_4$ is an allowable deviation for movement to the left.

One input 47 of the digital control 46 is coupled to the output of the operator control 34 and receives the input voltage $V_1$. A second input 48 is coupled to the sample-and-hold circuit 37 to receive the difference or error signal $V_{e2}$. The outputs 49 and 51 of the digital control are coupled to the solenoids 15 and 16, respectively. The outputs 49 and 51 are also coupled in parallel to the inputs 52 and 53 of an "EXCLUSIVE-OR" gate 54, the output 55 of which is coupled to the second input 56 of the "OR" gate 42.

The use of the sample-and-hold circuit enables the desired durability for the solenoid valves to be obtained. The sampling circuit controls the mode of operation as follows:

A. Decides during the sampling instant to turn either solenoid "ON" or "OFF", moving the piston in either direction.

B. Holds when the desired position is reached until the next sampling instant. The position is held by energizing both solenoids outside the neutral deadband and deenergizing both solenoids inside the neutral band.

The use of the sampling rate ensures the solenoids energize or de-energize at a rate no more than absolutely necessary for system stability.

When the magnitude of the operator signal $V_1$, designated $V_1$ on the logic table, is less than the neutral deadband $V_3$, both solenoids 15 and 16 are "off" and the piston remains in the neutral position regardless of the magnitude of $V_{e2}$, designated $V_{e2}$. When the magnitude of operator signal $V_1$ is greater than $V_3$, solenoid 15 or solenoid 16 is turned on to move the piston to the right or left depending on the error signal $V_{e2}$. If the magnitude of the error signal $V_{e2}$ is greater than "+" $V_{e4}$, solenoid 15 turns on and the piston moves to the right; if the magnitude of the error signal $V_{e2}$ is less than "−" $V_4$, then solenoid 16 turns on and the piston moves to the left. The movement of the piston continues either to the right or left until $V_{e2}$ is less than "+" or "−" $V_4$, as the case may be, at which instant both solenoids are "on" and the piston will remain on "hold" at the desired position.

The "exclusive-or" gate functions in a manner such that an output from it is available if one and only one of the solenoids is "on". If both solenoids are "on", that is, in the "hold" mode, the "exclusive-or" gate will not provide an output. Hence, once the desired position is reached and both solenoids are "on", no output from the sample-and-hold circuit can occur until the next clock pulse. This ensures that the operation of the solenoids is only in conjunction with the clock frequency— not any faster. This results in an extended, useful life of the solenoids.

To summarize, the decisions to move left, right or hold are performed by the electronic control system 33 shown in FIG. 2. The control system uses a clock 39 to provide a sampling frequency when decisions are to be made. During the sampling time interval, when the clock pulse is "high" and/or at a logic "1" state, the control system decides to turn either solenoid valve 15 or 16 on or off so as to move the piston 11 in either direction or to hold. This decision is made by comparing the desired position as indicated by the input voltage $V_1$ with the actual position of the actuator piston as measured by the position transducer (voltage Vv) attached to the actuator piston. If the desired position is reached, that position is held until the next sampling instant occurs, even if the input continues to change. This ensures that the solenoids will be turned on and off at a maximum frequency determined by the clock. This ensures an acceptable cycle life for the solenoid valves. The sampling frequency depends on the maximum frequency that the actuator is designed to follow and can be made variable. For example, if the actuator is designed to follow a 5 Hz signal, the sampling rate could be set at 20 Hz. The control logic could decrease the sampling frequency for input signals which are varying at a slower rate.

The positioning accuracy of the actuator, stated as a tolerance band TB, depends on the maximum time delay TD of the solenoid valves and the chosen rate of movement of the actuator piston $V_A$.

$$TB = V_A \cdot TD.$$

In practice, the control logic can decrease the tolerance band to some extent by advancing the instant of actuation of the solenoid valves as a function of the time delay of the valves and the rate of change of the input.

The primary advantages of this electro-hydraulic actuator are:

1—A proportional output is achieved by using simple on/off three-way solenoid valves which are relatively dirt insensitive and inexpensive.

2—The life of the solenoid valves is extended by limiting the maximum sampling frequency based on the maximum input frequency that is to be followed.

3—The actuator may be designed to exert large forces over large distances with little change to the basic control circuit.

It is to be understood that this invention is not limited to the exact construction illustrated and described above, but that various changes and modifications may be made without departing from the spirit and scope of the invention as defined in the appended claims.

We claim:

1. An electro-hydraulic proportional actuator, comprising:
   an actuator assembly having a double-acting, linearly-movable piston contained in a cylinder having a chamber at each end;
   a pair of three-way solenoid valves each of which has an actuator port, an inlet port and an outlet port;
   each end chamber of the actuator assembly cylinder being coupled to the actuator port of one of the valves,
   and each valve inlet port being coupled through a check valve to a fluid pressure source and the return ports being coupled to each other with the fluid flow therefrom being routed to a flow control valve;
   and an electronic control system for operating the solenoid valves to direct fluid flow into and out of the cylinder chambers, comprising:
   an operator control means providing an input voltage representing a desired actuator assembly piston position,
   a transducer means coupled to the actuator assembly to generate an output voltage representing the actual position of the piston,
   the difference between the input and output voltages generating a difference signal representing the difference between the actual and desired positions of the piston,
   a feedback system including a sample-and-hold circuit in a feedback path having an input to receive the difference signal,
   and a clock logic means for transmitting the difference signal from the feedback system to the solenoid valves at predetermined intervals to activate either valve to move the actuator piston in either direction or to activate both valves to hold the piston at a desired position.

2. An electro-hydraulic proportional actuator according to claim 1, in which:
   the electronic control system further comprises an "OR" gate having an output and two inputs;
   the clock logic means includes a clock means and a digital control means;
   the clock means provides a sampling frequency to one input of the "OR" gate;
   and the digital control means has an input coupled to the output of the sample-and-hold circuit and outputs coupled in parallel to the solenoid valves and to the second input of the "OR" gate;
   the output of the "OR" gate being coupled to an input of the sample-and-hold circuit.

3. An electro-hydraulic proportional actuator according to claim 1, in which:
   the electronic control system further comprises an "OR" gate having an output and two inputs and an "EXCLUSIVE-OR" gate having an output and two inputs;
   the clock logic means includes a clock means and a digital control means;
   the clock means provides a sampling frequency to one input of the "OR" gate;
   and the digital control means has an input coupled to the output of the sample-and-hold circuit and outputs coupled in parallel to the solenoid valves and to the inputs of the "EXCLUSIVE-OR" gate;
   the output of the "EXCLUSIVE-OR" gate being coupled to the second input of the "OR" gate.

4. An electro-hydraulic proportional actuator according to claim 2 or 3, in which:
   the flow control valve coupled to the outlet ports of the three-way solenoid valves limits the velocity of movement of the actuator piston.

5. An electro-hydraulic proportional actuator comprising:
   an actuator assembly having a double-acting linearly movable piston contained in a cylinder having a chamber at each end;
   a pair of three-way solenoid valves each of which has an actuator port, an inlet port, and an outlet port;
   each end chamber of the actuator assembly cylinder being coupled to the actuator port of one of the valves;
   and each valve inlet port being coupled through a check valve to a fluid pressure source and the return ports being coupled to each other with the fluid flow therefrom being routed to a flow control valve;
   and an electronic control system for operating the solenoid valves to direct fluid flow into and out of the cylinder chambers, comprising;
   an operator controlled means for providing an input voltage $V_1$ representing a desired actuator assembly piston position,
   a transducer means coupled to the actuator assembly to generate an output voltage $V_v$ representing the actual position of the piston,
   the difference between the input $V_1$ and output $V_v$ voltages forming a difference signal $V_{e2}$ representing the difference or error between the desired and actual positions of the actuator piston,
   a sample-and-hold circuit having an input to which the $V_{e2}$ signal is coupled,
   a clock logic means including a clock means providing a sampling frequency coupled through first input of an "OR" gate having an output and two inputs to an input of the sample-and-hold circuit,
   the output of the "OR" gate comprising a sample-and-hold circuit,
   the output of the "OR" gate comprising a sample-and-hold circuit input control signal $V_{sh}$,
   the sample-and-hold circuit passing the $V_{e2}$ signal when the $V_{sh}$ signal is in a logic "1" state and retaining the last value of $V_{e2}$ when the $V_{sh}$ returns to a logic "0" state,
   during a sampling instant, when the clock means sampling frequency pulse is high or in a logic "1" state, the control system operating to turn either solenoid valve on or off so as to move the piston in either direction or to hold the piston at a desired position until the next sampling instant.

6. An electro-hydraulic proportional actuator according to claim 5, in which:
   the clock logic means includes a digital control means, one input of which is coupled to the output of the sample-and-hold circuit and two outputs of which are coupled in parallel to the solenoid valves and the inputs of an "EXCLUSIVE-OR" gate;
   the output of the "EXCLUSIVE-OR" gate being coupled to the second input of the "OR" gate;
   the "EXCLUSIVE-OR" gate ensuring the frequency of solenoid operation to be the same as clock frequency and no faster, whereby the life of the solenoids is extended especially at low frequency input signals generated by an operator.

7. An electro-hydraulic proportional actuator according to claim 6, in which:

the digital control means has a circuit corresponding to the following logic table:

| $V_1$ | $V_{e2}$ | SOLENOIDS 15 | SOLENOIDS 16 | DIRECTION OF PISTON MOVEMENT |
|---|---|---|---|---|
| $|V_1| < V_3$ | ALL | 0 | 0 | HOLD IN NEUTRAL POSITION |
| $|V_1| > V_3$ | $|V_{e2}| < V_4$ | 1 | 1 | HOLD IN ANY POSITION OTHER THAN NEUTRAL |
| $|V_1| > V_3$ | $V_{e2} > V_4$ | 1 | 0 | RIGHT |
| $|V_1| > V_3$ | $V_{e2} < -V_4$ | 0 | 1 | LEFT | in which for the solenoids: 1 is "On", 0 is "Off", $V_3$ sets the neutral deadband and $V_4$ sets the deadband outside neutral;

the circuit producing digital output signals for activating the solenoids in accordance with the predetermined values of the neutral deadband and the deadband outside of the neutral zone and in conjunction with the operator controlled input position values.

8. An electro-hydraulic proportional actuator according to claims 5 or 7, in which:

the flow control valve coupled to the outlet ports of the solenoid valves limits the velocity of movement of the actuator piston.

* * * * *